US008584596B1

(12) United States Patent
Worden et al.

(10) Patent No.: US 8,584,596 B1
(45) Date of Patent: Nov. 19, 2013

(54) SUSPENSION SYSTEM, TRUCK AND SPRING SYSTEM FOR A VEHICLE (71) Applicant: General Electric Company, Schenectady, NY (US)

(72) Inventors: Bret Dwayne Worden, Union City, PA (US); Ajith Kuttannair Kumar, Erie, PA (US); Adrian Jerzy Gorski, Erie, PA (US); Jingjun Zhang, Erie, PA (US); Jeremy Thomas McGarry, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/653,553

(22) Filed: Oct. 17, 2012

(51) Int. Cl.
*B61D 1/00* (2006.01)

(52) U.S. Cl.
USPC .................. 105/157.1; 105/166; 105/168

(58) Field of Classification Search
USPC ......... 105/218.1, 224.05, 224.06, 224.1, 195, 105/196, 188, 182.1, 172, 166
See application file for complete search history.

(56) References Cited

U.S. PATENT DOCUMENTS

| 2,393,722 | A | * | 1/1946 | Travilla, Jr. | 105/195 |
|---|---|---|---|---|---|
| 2,660,960 | A | * | 12/1953 | Borgeaud et al. | 105/188 |
| 3,719,153 | A | * | 3/1973 | Schumacher | 105/182.1 |
| 3,911,830 | A | * | 10/1975 | Adams | 105/164 |
| 4,170,179 | A | * | 10/1979 | Vogel | 105/168 |
| 4,186,914 | A | * | 2/1980 | Radwill et al. | 267/4 |
| 4,679,506 | A | * | 7/1987 | Goding et al. | 105/136 |
| 4,679,507 | A | * | 7/1987 | Rassaian | 105/136 |
| 4,735,149 | A | * | 4/1988 | Scheffel et al. | 105/218.1 |
| 4,986,192 | A | * | 1/1991 | Wiebe | 105/198.4 |
| 5,131,332 | A | * | 7/1992 | Smith | 105/224.05 |
| 5,263,420 | A | * | 11/1993 | Schwendt et al. | 105/166 |
| 5,524,551 | A | * | 6/1996 | Hawthorne et al. | 105/198.4 |
| 5,575,221 | A | * | 11/1996 | Biegel et al. | 105/226 |
| 5,588,367 | A | * | 12/1996 | Scheffel | 105/168 |
| 5,613,444 | A | * | 3/1997 | Ahmadian et al. | 105/166 |
| 5,746,134 | A | * | 5/1998 | Scheffel | 105/168 |
| 5,746,135 | A | * | 5/1998 | Ahmadian et al. | 105/196 |
| 6,745,700 | B2 | * | 6/2004 | Ma et al. | 105/166 |
| 7,631,603 | B2 | * | 12/2009 | Forbes et al. | 105/157.1 |
| 7,954,436 | B2 | * | 6/2011 | Gorski et al. | 105/218.1 |
| 2009/0031915 | A1 | * | 2/2009 | Kumar et al. | 105/34.1 |
| 2009/0031916 | A1 | * | 2/2009 | Kumar et al. | 105/34.1 |
| 2009/0031917 | A1 | * | 2/2009 | Kumar et al. | 105/35 |
| 2009/0095196 | A1 | * | 4/2009 | Kumar et al. | 105/96 |
| 2009/0095197 | A1 | * | 4/2009 | Kumar et al. | 105/96 |
| 2009/0099714 | A1 | * | 4/2009 | Kumar et al. | 701/19 |
| 2011/0221159 | A1 | * | 9/2011 | Gorski et al. | 280/124.179 |

FOREIGN PATENT DOCUMENTS

| EP | 773152 | A1 | * | 5/1997 | ............... | B61F 5/30 |
| JP | 61024606 | A | * | 2/1986 | ............... | B60G 5/04 |

* cited by examiner

*Primary Examiner* — Jason C Smith
(74) *Attorney, Agent, or Firm* — GE Global Patent Operation; John A. Kramer (57) ABSTRACT

Vehicle suspension systems including a truck and a spring system for an axle are provided. In one example, a truck includes an unpowered axle spring system that is configured to generate an overall unpowered axle separation force between a truck frame and an unpowered axle carrier. The overall unpowered axle separation force has a rate of decrease that increases past a first separation distance between the truck frame and the unpowered axle carrier. A powered axle spring system is configured to generate a powered axle separation force between the truck frame and a powered axle carrier. The powered axle separation force has a rate of decrease that decreases past a second separation distance between the truck frame and the powered axle carrier.

12 Claims, 7 Drawing Sheets

TRACTIVE EFFORT REACTION FORCE SEPARATING EACH POWERED AXLE FROM THE FRAME (lbs)

FIG. 9

AXLE TO FRAME SEPARATION (INCHES)

FIG. 10

TRACTIVE EFFORT REACTION FORCE SEPARATING EACH
POWERED AXLE FROM THE FRAME (lbs)

SUSPENSION SYSTEM, TRUCK AND SPRING SYSTEM FOR A VEHICLE

FIELD

Embodiments of the subject matter disclosed herein relate to a vehicle suspension system including a truck and a spring system.

BACKGROUND

Vehicles may include multiple axles coupled to wheels for supporting the weight of the vehicle on a surface. Some vehicles, such as locomotives, may include a front truck and a rear truck with two or more axles on each truck. One or more of the axles may be powered by a traction motor mounted on a truck frame, while one or more other axles may be unpowered. Axles may be mounted to the truck frame via one or more suspension assemblies for distributing the weight of the locomotive and trucks among the axles.

As the locomotive wheels apply tractive effort to the rails, the load on each axle may shift. In some examples, weight may transfer from a powered axle to an unpowered axle, thereby decreasing the normal force on the rail at the powered axle. Under these conditions, the possibility of wheel slippage at the powered axle may increase thus decreasing the tractive force of the corresponding wheels. It will be appreciated that such weight transfer may be at least partially the result of reaction forces applied by the truck frame to the traction motor mounted on the truck frame and coupled to the powered axle. It will also be appreciated that such reaction forces are created by the torque applied by the traction motor to the powered axle.

In some prior attempts to address such weight transfer issues, dynamic weight transfer systems that actively adjust the corresponding suspension have been used. Such systems, however, typically require additional actuators, linkages and/or other components to affect the dynamic weight transfer. Such additional components add undesirable packaging space requirements, complexity, and cost to the vehicle. In other examples, linear-acting, passive weight transfer systems may be utilized. However, such systems are typically effective only when tractive effort is applied in one direction. When the vehicle is moved in the opposite direction, the weight transfer functionality does not function to provide a net benefit.

BRIEF DESCRIPTION

Thus, in one embodiment, a truck for a vehicle may include an unpowered axle spring system that couples an unpowered axle carrier to a truck frame. The unpowered axle spring system may be configured to generate an overall unpowered axle separation force between the truck frame and the unpowered axle carrier. Further, the unpowered axle spring system may be configured such that the overall unpowered axle separation force has a rate of decrease that increases past a first separation distance between the truck frame and the unpowered axle carrier.

The truck may also include a powered axle spring system that couples a powered axle carrier to the truck frame. The powered axle spring system may be configured to generate a powered axle separation force between the truck frame and the powered axle carrier. Further, the powered axle spring system may be configured such that the powered axle separation force has a rate of decrease that decreases past a second separation distance between the truck frame and the powered axle carrier.

Another embodiment comprises a spring system for an axle that includes a primary spring having a first effective spring rate. The primary spring may be configured to engage a truck frame at all times. The spring system may also include a secondary spring having a second effective spring rate. The secondary spring may be configured to engage the truck frame only after the truck frame expands past a threshold, to thereby resist further expansion.

In another embodiment, a suspension system for a vehicle (e.g., locomotive or other rail vehicle) may include a front truck comprising a front powered axle carrier that is coupled to a front powered axle. A front powered axle spring system may couple the front powered axle carrier to a front truck frame. The suspension system may also include a front unpowered axle carrier that is coupled to a front unpowered axle. A front unpowered axle spring system may couple the front unpowered axle carrier to the front truck frame. The front unpowered axle spring system may be configured to generate a front unpowered axle separation force that is substantially linear as a front separation distance between the front truck frame and the front unpowered axle carrier decreases upon application of a tractive effort.

The suspension system may also include a rear truck comprising a rear powered axle carrier that is coupled to a rear powered axle. A rear powered axle spring system may couple the rear powered axle carrier to a rear truck frame. The suspension system may also include a rear unpowered axle carrier that is coupled to a rear unpowered axle. A rear unpowered axle spring system may couple the rear unpowered axle carrier to the rear truck frame. The rear unpowered axle spring system may be configured to generate a rear unpowered axle separation force whose rate of decrease decreases past a rear separation distance between the rear truck frame and the rear unpowered axle carrier upon application of the tractive effort.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF FIGURES

The present invention will be better understood from reading the following description of non-limiting embodiments, with reference to the attached drawings, wherein below.

DETAILED DESCRIPTION

The following description relates to various embodiments of a suspension system and associated trucks and spring systems for transferring weight among axles and associated wheels that support a vehicle. As an example, the vehicle may be a locomotive or other rail vehicle that may be positioned on a rail. In some examples, the vehicle may be a rail vehicle that includes a suspension system comprising front and rear trucks. Both front and rear trucks include one or more powered axles that apply tractive effort to the rail via wheels. Both front and rear trucks also include one or more unpowered axles. Powered axle spring systems couple the powered axles to the front and rear trucks. Unpowered axle spring systems couple the unpowered axles to the front and rear trucks. In one example, the unpowered axle spring systems may increase normal forces on the rail via the powered axles and associated wheels (and thus increase tractive force) by distributing at least a portion of a supported load from unpowered axles to powered axles.

In one embodiment, a truck includes an unpowered axle spring system that couples an unpowered axle carrier to a truck frame. The unpowered axle spring system is configured to generate an overall unpowered axle separation force between the truck frame and the unpowered axle carrier. More particularly, the overall unpowered axle separation force is characterized by a rate of decrease that increases past a first separation distance between the truck frame and the unpowered axle carrier. The truck also includes a powered axle spring system that couples a powered axle carrier to the truck frame. The powered axle spring system is configured to generate a powered axle separation force between the truck frame and the powered axle carrier. More particularly, the powered axle separation force is characterized by a rate of decrease that decreases past a second separation distance between the truck frame and the powered axle carrier. Advantageously, and as explained in more detail below, upon application of a tractive effort the truck and associated spring systems increase tractive force at the wheels of the powered axle coupled to the powered axle carrier by transferring weight from the unpowered axle carrier to the powered axle carrier.

In another advantage that may be realized in the practice of some embodiments of the present disclosure, the unpowered axle spring system may also create such increased normal force on the rail via one or more powered axles regardless of whether the tractive effort is in a first direction or a second, opposite direction. In this manner, the spring systems and associated trucks may provide increased tractive force when the rail vehicle is moving in either direction along the rail.

In one example, the unpowered axle spring system may be a passively operating spring system. For purposes of this disclosure, "passively operating" means that no separately powered components are utilized to operate the unpowered axle spring system. A separately powered component may include, for example, a pneumatically, hydraulically, or electrically operated actuator, mechanism, or other component that changes the operation of the unpowered spring system. Advantageously, such a passively operated spring system may occupy less packaging space on a corresponding truck, and may provide a less complex and/or less expensive option as compared to dynamic weight transfer systems that utilize separately powered components.

Figure 1:
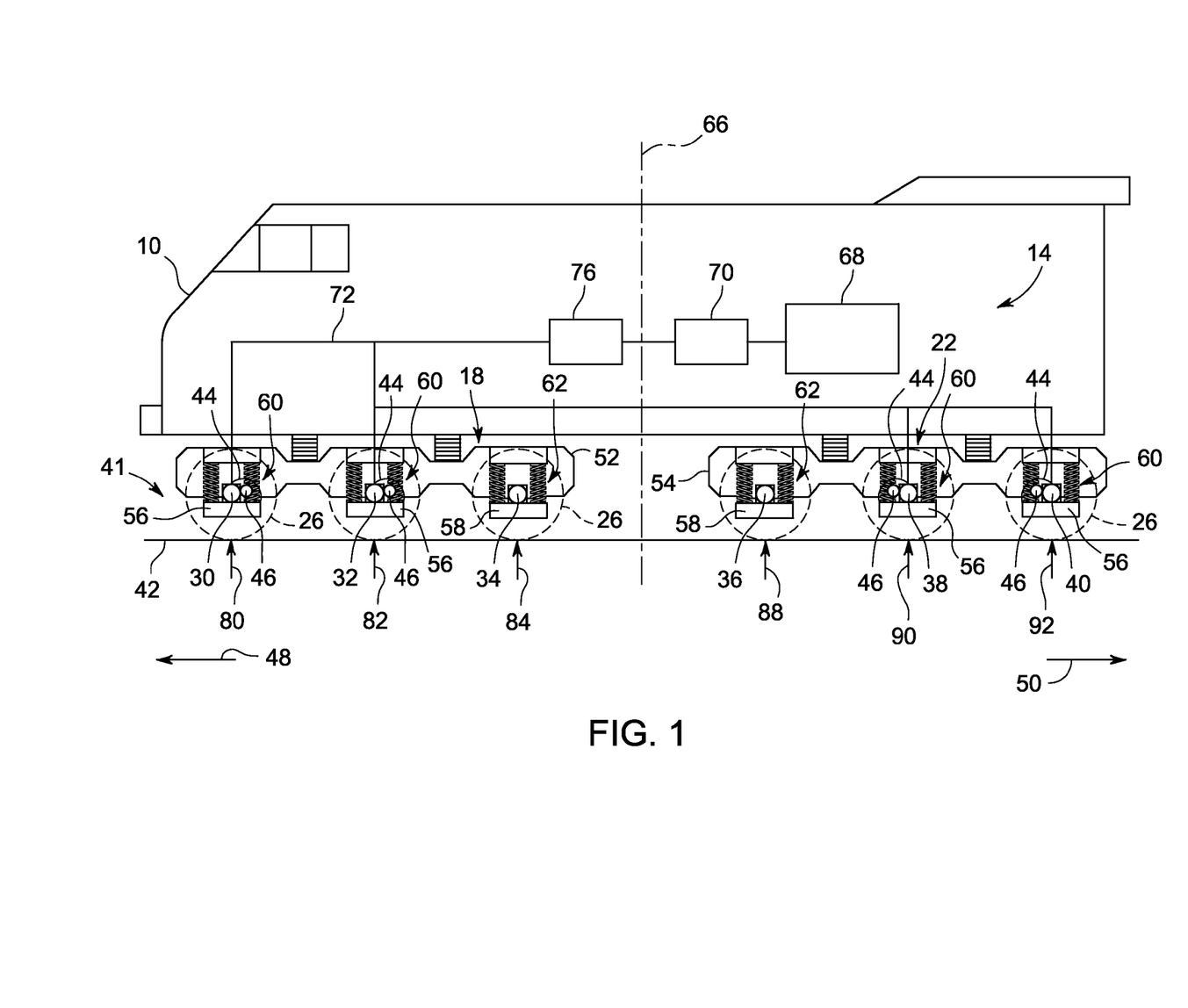
FIG. 1 shows a schematic diagram of a locomotive including a suspension system, truck and spring system according to an embodiment of the present disclosure.

FIG. 1 shows a schematic diagram of an example locomotive 10 that includes a suspension system 14 including a front truck 18, rear truck 22 and associated spring systems according to the present disclosure. It will be appreciated that the embodiments discussed herein may be utilized with other vehicles, including wheeled vehicles, rail vehicles, track vehicles, etc. The locomotive 10 is configured to travel along a track that includes a pair of rails 42 (with only one of the rails 42 being shown). The locomotive 10 includes a plurality of locomotive wheels 26 which are each received by a respective axle 30, 32, 34, 36, 38, and 40. The locomotive 10 and plurality of wheels 26 may move along a respective rail 42 of the track in a first travel direction 48 during a first tractive effort condition. The locomotive 10 and plurality of wheels 26 may also move along the rail 42 in a second travel direction 50 opposite to the first travel direction 48 during a second tractive effort condition.

As illustrated in the embodiment of FIG. 1, the locomotive 10 includes a pair of trucks comprising a front truck 18 and a rear truck 22. The front truck 18 is configured to receive axles 30, 32, and 34, and the rear truck 22 is configured to receive axles 36, 38, and 40. As described in more detail below, the front truck 18 may include a front truck frame 52 configured to provide compliant engagement with axle carriers 56, 58 via spring systems 60, 62. The rear truck 22 may include a rear truck frame 54 configured to provide compliant engagement with axle carriers 56, 58 via spring systems 60, 62.

It will be appreciated that the locomotive 10 includes a second front truck (not shown) that also receives axles 30, 32 and 34, with the axles coupled to opposing wheels (not shown) that engage the other rail 42. Similarly, the locomotive 10 includes a second rear truck (not shown) that also receives axles 36, 38 and 40, with the axles coupled to opposing wheels (not shown) that engage the other rail 42.

In one example, the front truck 18 is rotatable and may be rotated 180 degrees such that the front truck 18 may be installed as the rear truck 22 of the locomotive 10. Thus, in one advantage that may be realized in the practice of some embodiments disclosed herein, and as explained in more detail below, a single truck configuration may be utilized as both the front truck 18 and the rear truck 22 of the locomotive 10.

The front truck 18 may include a pair of powered axles 30 and 32 and an unpowered axle 34 positioned between the middle powered axle 32 and a center of gravity 66 of the locomotive 10. The powered axles 30 and 32 are each respectively coupled to a traction motor 44 via a gear 46. Each traction motor 44 is mounted to the front truck frame 52. Similarly, the rear truck 22 may include a pair of powered axles 38 and 40 and an unpowered axle 36 positioned between the middle powered axle 38 and the center of gravity 66 of the locomotive 10. The powered axles 38 and 40 are also each respectively coupled to a traction motor 44 via a gear 46. Each traction motor 44 is mounted to the rear truck frame 54. It will be appreciated that while FIG. 1 illustrates a pair of adjacent powered axles and an unpowered axle positioned between the middle powered axle and the locomotive center of gravity for each truck, the front truck 18 and rear truck 22 may include any number of powered axles and at least one unpowered axle, with the powered and unpowered axles having any positional arrangement on the truck.

In front truck 52 of the embodiment illustrated in FIG. 1, the gear 46 is positioned behind each of the powered axles 30 and 32. For ease of description, the engagement of gear 46 with the powered axle 30 will now be described. It will be appreciated that the following description also applies to the engagement of gear 46 with the powered axle 32. To move the locomotive 10 in the first travel direction 48, the traction motor 44 applies torque to the gear 46 to rotate the gear in a clockwise direction. In turn, the gear 46 engages the powered axle 30 to rotate the powered axle and associated wheel 26 in a counter-clockwise direction. In this configuration, it will be appreciated that fraction motor 44 will generate a linear reaction force on the front truck frame 52 that tends to contract the front truck frame 52 toward the powered axle 30.

In rear truck 54, the gear 46 is positioned in front of each of the powered axles 38 and 40. To move the locomotive 10 in the first travel direction 48, the traction motor 44 applies torque to the gear 46 to rotate the gear in a clockwise direction. In turn, the gear 46 engages the powered axle 30 to rotate the powered axle and associated wheel 26 in a counter-clockwise direction. In this configuration, it will be appreciated that fraction motor 44 will generate a linear reaction force on the front truck frame 52 that tends to expand the rear truck frame 54 away from the powered axles 38, 40.

Each of the powered axles 30, 32, 38, and 40 includes a powered axle spring system 60 that couples a powered axle carrier 56 to the front truck frame 52 or rear truck frame 54. Each of the unpowered axles 34 and 36 includes an unpowered axle spring system 62 that couples an unpowered axle carrier 58 to the front truck frame 52 or rear truck frame 54. The powered axle spring systems 60 and unpowered axle spring systems 62 may include various elastic and/or damping members, such as compression springs, leaf springs, coil springs, etc. Additional details of the powered axle spring systems 60 and unpowered axle spring systems 62 are described below with regard to FIGS. 2-4.

With reference again to FIG. 1, in one example the locomotive 10 may be a diesel-electric locomotive operating a diesel engine 68. In other embodiments alternate engine configurations may be employed, such as a gasoline engine, a biodiesel, natural gas engine, a dual-fuel engine, or any other suitable engine configuration. The traction motors 44 mounted on front and rear truck frames 52, 54 may receive electrical power from an alternator 70 via DC bus 72 to provide tractive power to propel the locomotive 10. As described herein, traction motor 44 may be an AC motor. Accordingly, an inverter 76 paired with the traction motor 44 may convert the DC input to an appropriate AC input, such as a three-phase AC input, for subsequent use by the traction motor. In other embodiments, traction motor 44 may be a DC motor directly employing the output of the alternator 70 after rectification and transmission along the DC bus 72. One example configuration of locomotive 10 may include one inverter/traction motor pair per wheel axle.

In some examples, a traction motor 44 may also act as a generator providing dynamic braking to brake locomotive 10. During dynamic braking, the traction motor 44 may provide torque in a direction that is opposite from the rolling direction of the wheel, thereby generating electricity that is dissipated as heat by a grid of resistors (not shown) connected to the bus 72. In one example, the grid includes stacks of resistive elements connected in series to the bus 72. Air brakes (not shown) making use of compressed air may also be used by locomotive 10 as part of a vehicle braking system. In other examples, a regenerative braking system may store the electricity generated by the traction motor 44 in an energy storage unit.

Figure 2:
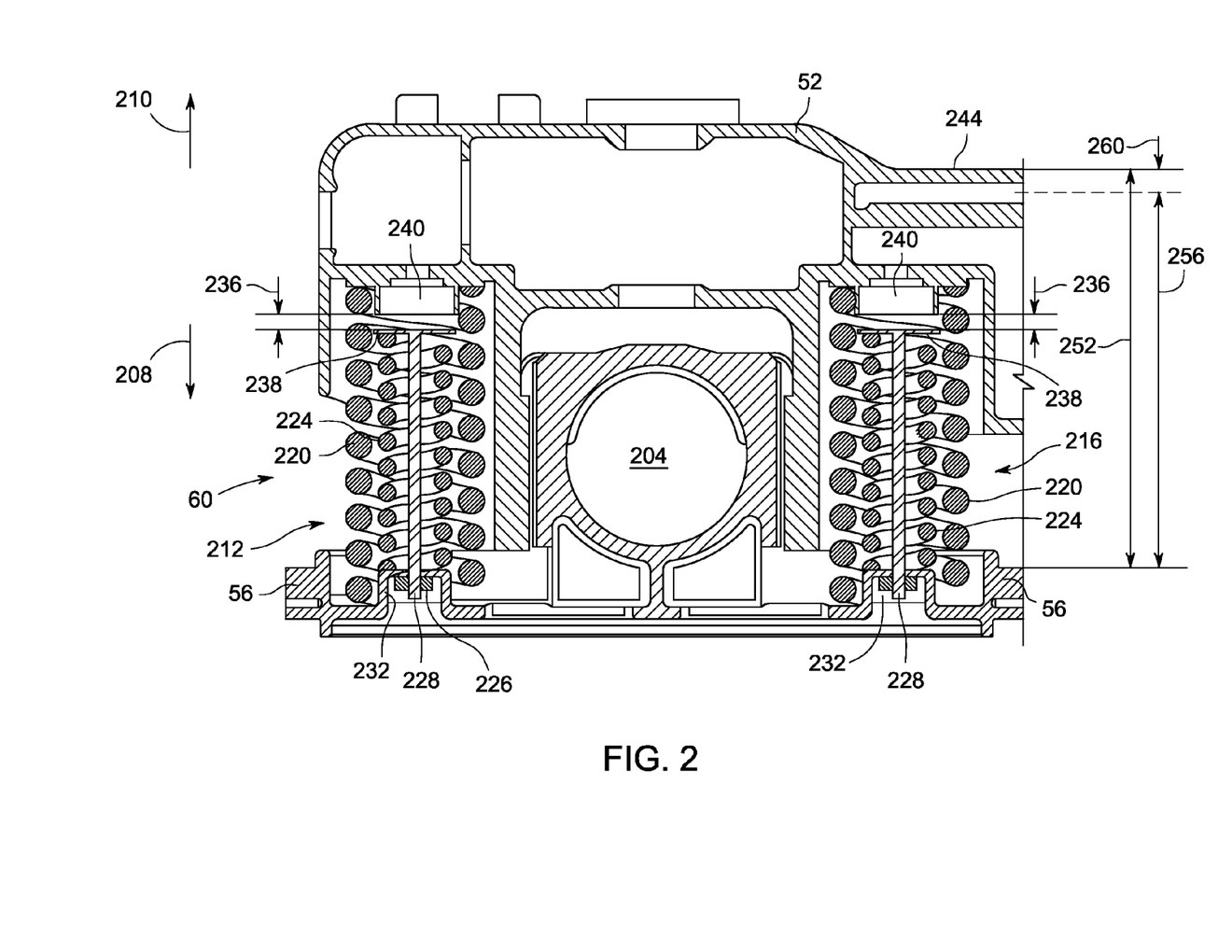
FIG. 2 is a section view of a portion of a truck frame of a truck and a powered axle spring system according to an embodiment of the present disclosure.
Figure 3:
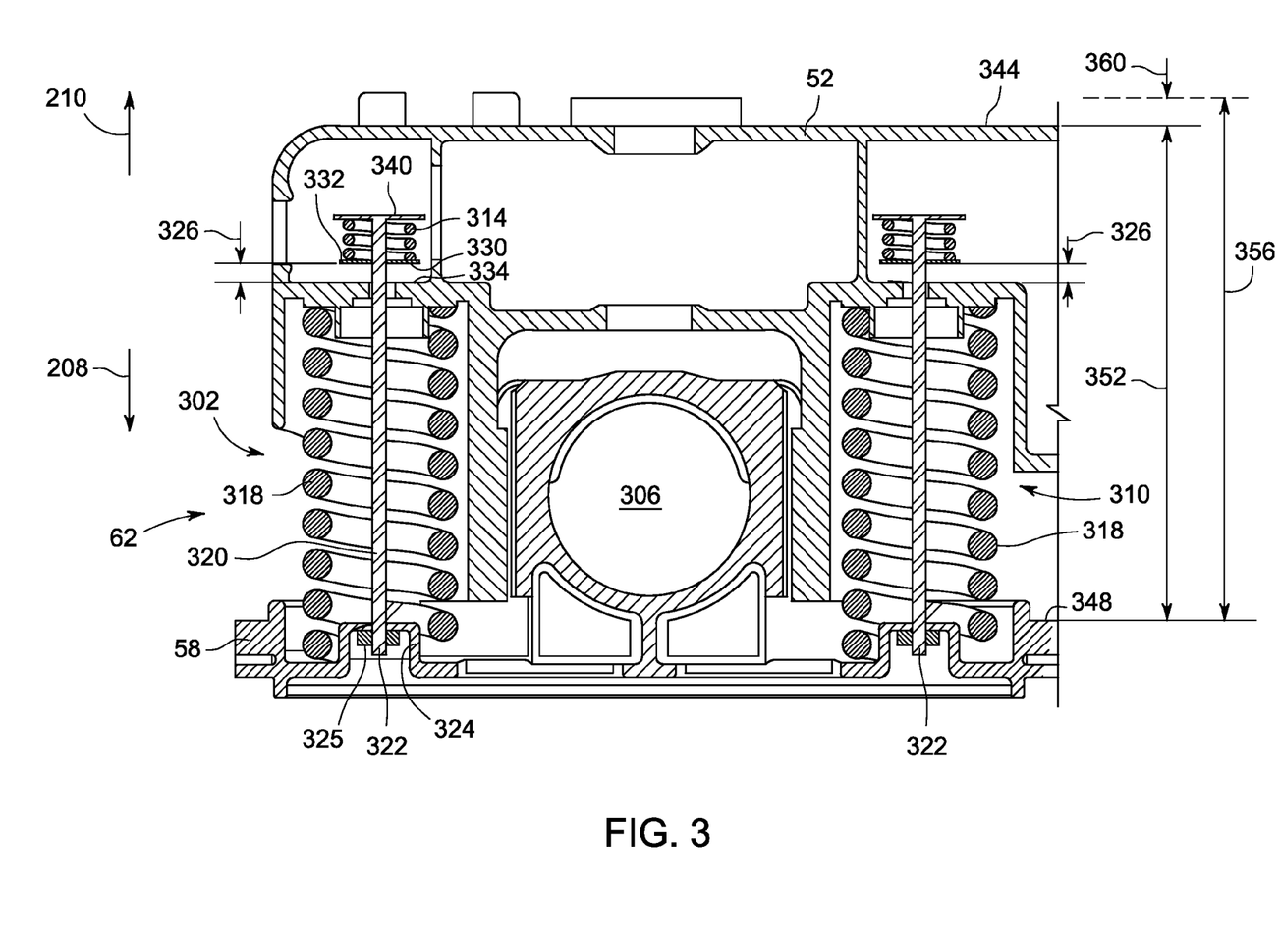
FIG. 3 is a section view of a portion of a truck frame of a truck and an unpowered axle spring system according to an embodiment of the present disclosure.
Figure 4:
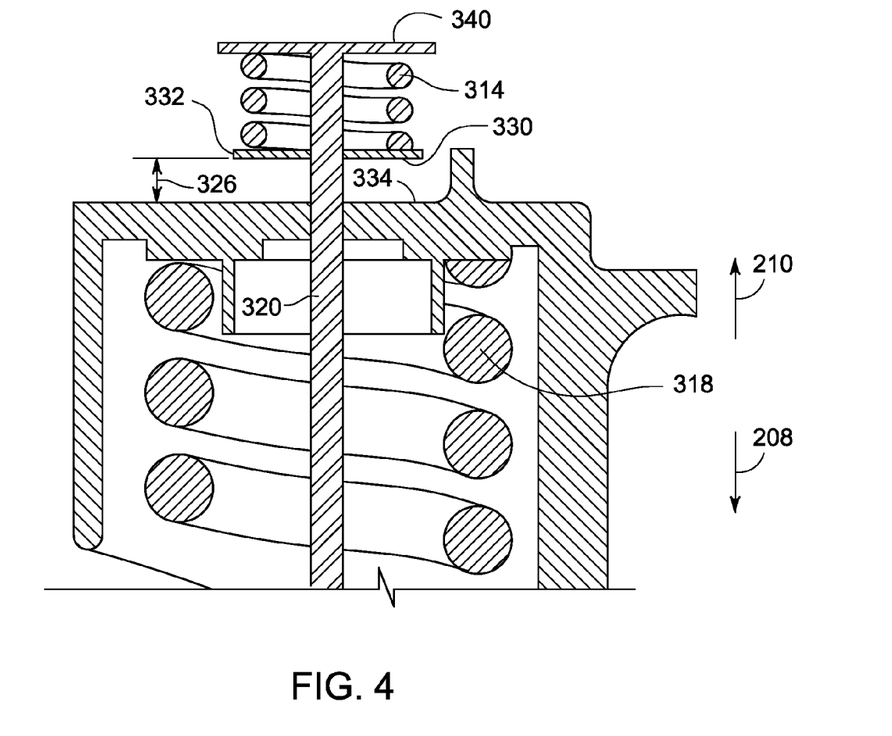
FIG. 4 is a detailed section view of a portion of the unpowered spring system shown in FIG. 3.

With reference now to FIGS. 2-4, the following description of one embodiment of powered axle spring systems 60 and unpowered axle spring systems 62 is provided with reference to the front truck frame 52 of the front truck 18. It will be appreciated that the rear truck frame 54 of the rear truck 22 may include similar powered axle spring systems 60 and unpowered axle spring systems 62.

FIG. 2 illustrates a side view of an example powered axle spring system 60 and associated powered axle carrier 56 of the front truck 18 shown in FIG. 1. The powered axle carrier 56 may be configured to receive a powered axle 30 or 32 in aperture 204. The powered axle spring system may be configured to support a portion of the weight of the locomotive 10 that is transferred via the front truck frame 52. As explained in more detail below, powered axle spring system 60 may be configured to resist movement of the truck frame 52 in a contraction direction indicated by action arrow 208 toward the powered axle carrier 56. Alternatively expressed, the powered axle spring system 60 may be configured to generate a powered axle separation force between the front truck frame 52 and the powered axle carrier 56 that biases the front truck frame 52 away from the powered axle carrier 56. It will be appreciated that the front truck frame 52 may also move in an expansion direction away from the powered axle carrier 56, indicated by action arrow 210. It will also be appreciated that the powered axle spring system 60 illustrated in FIG. 2 may be substantially similar to the powered axle spring system 60 located at each of the powered axles 30, 32, 38 and 40.

In the example configuration shown in FIG. 2, the powered axle spring system 60 includes a front spring assembly 212 located on a forward side of the axle aperture 204 and a rear spring assembly 216 located on a rear side of the axle aperture. Each of the front spring assembly 212 and the rear spring assembly 216 includes an exterior spring 220 and an interior spring 224. As explained in more detail below, the exterior spring 220 couples the front truck frame 52 to the powered axle carrier 56 and is configured to always promote separation between the front truck frame and the powered axle carrier.

In one example, the powered axle spring system 60 may have an effective spring rate that is non-linear with the relative displacement of the front truck frame 52 toward the powered axle carrier 56. In the illustration of FIG. 2, the powered axle spring system 60 is shown in an unloaded or free state, in that the powered axle spring system 60 is not supporting weight shifted from another axle.

The interior spring 224 may be pre-compressed and aligned by spring seat bar 228, which passes through a hole in a base element 232 of the powered axle carrier 56 and has a threaded end engaging with a nut 226. In one example, the threaded shaft of the spring seat bar 228 allows for height adjustment and adjustment of the pre-compression of interior spring 224. This enables variation of the non-linear spring rate of the powered axle spring system 60 to accommodate different locomotive configurations, for example. As shown in FIG. 2, in the unloaded state a gap 236 exists between a head 238 of the spring seat bar 228 that retains the interior spring 224 in its pre-compressed state and a mating surface on a powered axle engagement member 240 of the front truck frame 52. In one example, the head 238 may be shaped as a disk. Further, in the unloaded state an upper surface 244 of the front truck frame 52 may be separated from an upper surface 248 of the powered axle carrier 56 by an unloaded separation distance 252.

In one example, the front spring assembly 212 and rear spring assembly 216 may generate non-linear effective spring rates, in that during an initial compression (e.g., contraction of the front truck frame 52 toward the powered axle carrier 56) from the unloaded state shown in FIG. 2, only the exterior spring 220 is compressed. However, once the powered axle engagement member 240 contacts the spring seat bar head 238, both the interior spring 224 and exterior spring 220 are compressed, thereby increasing the effective spring rate of the associated spring assembly 212, 216 as the truck frame 52 continues to be compressed toward the powered axle carrier 56.

During operating conditions where only the exterior spring 220 supports the weight of the locomotive (e.g., a substantially low or no amount of weight shifting away from an unpowered axle to a powered axle), the interior spring 224 is not engaged by the powered axle engagement member 240. In this manner, the interior spring 224 does not support the locomotive 10 or couple the locomotive to the rail of the track. However, in operating conditions with both exterior spring 220 and interior spring 224 supporting the weight of the locomotive 10 (e.g., a substantially high amount of weight shifting away from an unpowered axle to a powered axle), the interior spring 224 is engaged by the powered axle engagement member 240 and thus the interior spring 224 and exterior spring and 220 support the locomotive and couple the locomotive to the rail of the track.

In one example the powered axle spring system 60 may be in a compressed state in which the powered axle engagement member 240 is in contact with the head 238, and a separation distance between the upper surface 244 of the front truck frame 52 and the upper surface 248 of the powered axle carrier 56 is less than unloaded separation distance 252. Beginning at such a compressed state, as the front truck frame 52 moves away from the powered axle carrier 56 in the expansion direction 210, the powered axle separation force generated by the powered axle spring system 60 decreases at a given rate. It will be appreciated that such a given rate corresponds to the effective spring rate of the combination of the exterior spring 220 and interior spring 224. As the separation distance reaches a transition separation distance 256, the powered axle engagement member 240 disengages from the spring seat bar head 238 and the interior spring 224 ceases to contribute to the powered axle separation force. Accordingly, at this point the rate of decrease of the powered axle separation force decreases as the front truck frame 52 moves past the transition separation distance 256. In one example, the difference 260 between the unloaded separation distance 252 and the transition separation distance 256 is equal to the distance across gap 236. Advantageously, and as explained in more detail below, this configuration enables the powered axle spring system 60 to operate together with the unpowered axle spring system 62 to increase normal forces on the rail via the powered axles and associated wheels.

While FIG. 2 shows the interior spring 224 and exterior spring 220 in parallel with one another, it will be appreciated that in other examples the springs may be positioned in series with one another. Further, while different engagement positions are used to generate the non-linear effective spring rate, other approaches may also be used, such as a single spring with variable wire thickness, variable materials along a height of the spring, variable coil pitches, etc.

With reference now to FIGS. 3 and 4, an unpowered axle spring system 62 may be employed to reduce the weight on the unpowered axles 34 and 36 under various operating conditions, and correspondingly increase the weight on the powered axles 30, 32, 38, and 40. Advantageously, and as explained in more detail below, a truck and associated suspension system that utilize this configuration of an unpowered axle spring system may provide enhanced tractive effort to the wheels of the powered axles regardless of the direction of travel.

Also as explained in more detail below, the unpowered axle spring system 62 may be configured to generate an overall unpowered axle separation force between the front truck frame 52 and the unpowered axle carrier 58 that biases the front truck frame away from the unpowered axle carrier. More particularly, the overall unpowered axle separation force is characterized by a rate of decrease that increases past a transition separation distance between the front truck frame 52 and the unpowered axle carrier 56. Advantageously, and as explained in more detail below, this configuration enables the truck and associated spring systems to increase tractive force at the wheels of the powered axles by transferring weight from the unpowered axle carrier 58 to the powered axle carrier 56.

As shown in FIG. 3, in one example the unpowered axle spring system 62 may include a front spring assembly 302 located on a forward side of the axle aperture 306 and a rear spring assembly 310 located on a rear side of the axle aperture. Each of the front spring assembly 302 and the rear spring assembly 310 includes a primary spring 318 and a secondary spring 314 coaxial with the primary spring. The primary spring 318 may have a first effective spring rate, and the secondary spring 314 may have a second effective spring rate. Depending upon the configuration of an associated truck and suspension system, the second effective spring rate of the secondary spring 314 may be greater than, equal to, or less than the first effective spring rate of the primary spring 318. The primary spring 318 may be configured to engage the truck frame 52 at all times to provide at least a portion of the overall unpowered axle separation force.

In one example, the front spring assembly 302 and rear spring assembly 310 may include the same configuration and components. Accordingly, the following description of front spring assembly 302 applies equally to rear spring assembly 310. It will also be appreciated that the unpowered axle spring system 62 illustrated in FIG. 3 may be representative of the unpowered axle spring system of both of the unpowered axles 34 and 36.

The secondary spring 314 and primary spring 318 may be aligned by the shaft 320 of an alignment bar 322. The shaft 320 may extend through a hole in a base element 324 of the unpowered axle carrier 58 and include a threaded end that engages a nut 325. The primary spring 318 may also couple the unpowered axle carrier 58 to the front truck frame 52 of the truck via supporting member 334. In this manner, the front truck frame 52 may be supported by the unpowered axle spring system 62, and the front truck frame and supporting member 334 may move in the contraction direction 208 and expansion direction 210 relative to the secondary spring 314 and the shaft 320 of the alignment bar 322.

In the illustration of FIG. 3, the unpowered axle spring system 62 is shown in an unloaded or free state, in that the unpowered axle spring system 62 is not supporting weight shifted from another axle. As shown in FIGS. 3 and 4, in an unloaded state a gap 326 may exist between an unpowered axle engagement member 330 and the supporting member 334 of the truck frame 52. Further, in the unloaded state an upper surface 344 of the front truck frame 52 may be separated from an upper surface 348 of the unpowered axle carrier 58 by an unloaded separation distance 352. In one example, the unpowered axle engagement member 330 may be configured as a disk 332 that extends from the shaft 320 of the alignment bar 322.

As illustrated in FIGS. 3 and 4, the disk 332 may be configured to engage the supporting member 334 of the truck frame 52 only at a first displacement of the supporting member away from the unpowered axle carrier 58 in the expansion direction 210, where the first displacement equals the distance across the gap 326. Once the supporting member 334 engages the disk 332, the disk may move in the expansion direction 210 relative to the shaft 320 and compress the secondary spring 314. As the supporting member 334 and disk 332 move and compress the secondary spring 314, the secondary spring resists movement of the supporting member 334 and associated truck frame 52 in the expansion direction 210 with a second effective spring rate. Alternatively expressed, the secondary spring 314 may be configured to engage the front truck frame 52, via disk 332, only after the front truck frame expands past a threshold that equals the distance across gap 326, to thereby provide additional resistance to further expansion of the front truck frame. In this manner, the secondary spring 314 may function to reduce the overall unpowered axle separation force between the front truck frame 52 and the unpowered axle carrier 58 as the front truck frame expands past the threshold.

As a further illustration of the operation of front spring assembly 302, beginning at the unloaded state depicted in FIG. 3, as the front truck frame 52 moves away from the unpowered axle carrier 58 in the expansion direction 210, the overall unpowered axle separation force generated by the unpowered axle spring system 62 decreases at a given rate. At this point it will be appreciated that such a given rate corresponds to the effective spring rate of the primary spring 318, as only the primary spring is biasing the front truck frame 52 away from the unpowered axle carrier 58. As the separation distance between the upper surface 344 of the front truck frame 52 and the upper surface 348 of the unpowered axle carrier 58 reaches a transition separation distance 356, the supporting member 334 engages the disk 332 to begin compressing the secondary spring 314. In this manner, the secondary spring 314 begins reducing the overall unpowered axle separation force. Alternatively expressed, the secondary spring 314 opposes the unpowered axle separation force produced by the primary spring 318. In one example, the second effective spring rate of the secondary spring 314 may be substantially linear.

Accordingly, at this point the rate of decrease of the overall unpowered axle separation force increases as the front truck frame 52 moves past the transition separation distance 356. In one example, the difference 360 between the unloaded separation distance 352 and the transition separation distance 356 is equal to the distance across gap 326. Advantageously, and as explained in more detail below, this configuration enables the unpowered axle spring system 62 to increase normal forces on the rail via the powered axles and associated wheels.

In another example, the front truck frame 52 may be positioned such that the separation distance between the front truck frame and the unpowered axle carrier 58 is greater than the transition separation distance 356. Accordingly, in this position the secondary spring 314 is compressed by the supporting member 334. As the front truck frame 52 moves from this position in the contraction direction 208 toward the unpowered axle carrier 58, the secondary spring 314 decompresses and the engagement member 330/disk 332 disengages from contact with the supporting member 334 only when the truck frame reaches the transition separation distance 356. Accordingly, as the front truck frame 52 moves past the transition separation distance 356, the secondary spring 314 ceases to reduce the overall unpowered axle separation force.

With reference also to FIG. 1 and as noted above, the suspension system 14 may include a front truck 18 having two powered wheels 26 with associated powered axles 30, 32 and powered axle spring systems 60, and one unpowered wheel with associated unpowered axle 34 and unpowered axle spring system 62. The unpowered axle 34 and associated unpowered axle spring system 62 may be located laterally closer to the center of gravity 66 of the locomotive 10 than the powered axles 30, 32 and powered axle spring systems 62, with the two powered axles 30, 32 located in front of the unpowered axle. The rear truck 22 of suspension 14 may also include two powered wheels 26 with associated powered axles 38, 40 and powered axle spring systems 60, and one unpowered wheel with associated unpowered axle 36 and unpowered axle spring system 62. As with the front truck 18, in the rear truck 22 the unpowered axle 36 and associated unpowered axle spring system 62 may be located closer to the center of gravity 66 of the locomotive 10 than the powered axles 38, 40 and powered axle spring systems 62, with the two powered axles 38, 40 located behind the unpowered axle.

With reference to the front truck 18, in a first tractive effort condition the traction motors 44 may engage the powered axles 30, 32 to accelerate the locomotive 10 in the first travel direction 48. As noted above, reaction forces between the motors 44 and the front truck frame 52 may tend to contract the front truck frame toward the powered axles 30, 32 and unpowered axle 34. With reference to FIG. 2 and the powered axle spring system 60, as the front truck frame 52 moves in the contraction direction 208 and passes the transition separation distance 256, the interior spring 224 engages the powered axle engagement cylinder 240 to increase the powered axle separation force. At the same time and with reference to FIG. 3 and the unpowered axle spring system 62, as the front truck frame 52 moves in the contraction direction 208 the primary spring 318 generates the unpowered axle separation force. In one example, this front unpowered axle separation force is substantially linear as the separation distance between the front truck frame 52 and the front unpowered axle carrier 56 decreases.

Advantageously, in the first tractive effort condition this configuration transfers weight of the locomotive 10 away from the unpowered axles 34 and correspondingly increases weight on the powered axles 30, 32. This consequently increases the upward normal forces 80, 82 on the wheels of the powered axles 30, 32, thereby also increasing the tractive effort on the rail 42 at the powered axles.

It will be appreciated that in some embodiments the effective spring rate of the powered axle spring system 60 of powered axle 30 may be same as the effective spring rate of the powered axle spring system 60 of the other powered axle 32 of the front truck 18. In other embodiments, the effective spring rate of the powered axle spring system 60 of powered axle 30 may be different from the effective spring rate of the powered axle spring system 60 of the other powered axle 32.

With reference now to the rear truck 22, in the first tractive effort condition the traction motors 44 may also engage the powered axles 38, 40 to accelerate the locomotive 10 in the first travel direction 48. As the traction motors 44 are positioned in front of the powered axles 38, 40, reaction forces between the motors 44 and the rear truck frame 54 may tend to separate the rear truck frame away from the powered axles 38, 40 and unpowered axle 36. With reference to FIG. 2 and the powered axle spring system 60, as the front truck frame 52 moves in the expansion direction 210 and passes the transition separation distance 256, the interior spring 224 disengages from the powered axle engagement cylinder 240 to decrease the powered axle separation force. At the same time and with reference to FIG. 3 and the unpowered axle spring system 62, as the front truck frame 52 moves in the expansion direction 210 and passes the transition separation distance 356, the secondary spring 314 engages the supporting member 334 of the truck frame 52 and opposes the overall unpowered axle separation force. In this example, it will be appreciated that this rear unpowered axle separation force has a rate of decrease that decreases past the transition separation distance 356.

In this manner, the unpowered axle spring system 62 may provide less axle separation force than the powered axle spring system 60. Advantageously, in the first tractive effort condition this configuration also transfers weight of the locomotive 10 away from the unpowered axle 36 and correspondingly increases weight on the powered axles 38, 40 in the rear truck 22. This consequently increases the upward normal forces 90, 92 on the wheels of the powered axles 38, 40, thereby also increasing the tractive effort on the rail 42 at these powered axles.

In another example involving a second tractive effort condition, the traction motors 44 may engage the powered axles to accelerate the locomotive 10 in the second travel direction 50 that is opposite to the first travel direction 48. It will be appreciated that in this example, the reaction forces at the powered axles 30, 32, 38, and 40 will be in the opposite direction as compared to the reaction forces generated in the first tractive effort condition discussed above. Advantageously, the configuration and components of the front truck 18 and rear truck 22 described above may operate under the second tractive effort condition to increase the tractive effort on the rail 42 at the powered axles 30, 32 of the front truck 18 and the powered axles 38, 40 of the rear truck 22 by increasing the weight on the powered axles and correspondingly increasing the upward normal forces on the wheels of the powered axles. Alternatively expressed, under the second tractive effort condition the powered axle spring systems 60 of the front truck 52 may operate to increase the tractive effort on the rail 42 at the powered axles 30, 32 in the same manner as the powered axle spring systems 60 of the rear truck 54 under the first tractive effort condition. Similarly, under the second tractive effort condition the unpowered axle spring systems 62 of the front truck 52 may operate to increase the tractive effort on the rail 42 at the powered axles 30, 32 in the same manner as the unpowered axle spring systems 62 of the rear truck 54 under the first tractive effort condition.

Advantageously and as noted above, in one embodiment the configuration of the front truck 18 is rotatable and may be rotated 180 degrees and installed as the rear truck 22 of the locomotive 10. Alternatively expressed, a truck having the configuration of front truck 18 as described herein may be utilized as both the front truck and the rear truck of a rail vehicle. In this manner, when the front truck 18 is rotated 180 degrees and installed as the rear truck 22, the rate of decrease of the overall unpowered axle separation force still increases past a first separation distance between the rear truck frame 54 and the unpowered axle carrier 58. Similarly, the rate of decrease of the powered axle separation force still decreases past a second separation distance between the rear truck frame 54 and the powered axle carrier 56.

As noted above, in one example the powered axle spring systems 60 may have an effective spring rate that is substantially non-linear with the displacement of the truck frame 52 in the contraction direction 208 toward the powered axle carrier 56. Conversely, the unpowered axle spring systems 62 may have a substantially non-linear effective spring rate with the displacement of the truck frame 52 in the expansion direction away from the unpowered axle carrier 58. In an advantage that may be realized in some embodiments of the present disclosure, the combination of a substantially non-linear spring rate at the powered axle spring systems 60 in the contraction direction with a substantially non-linear effective spring rate at the unpowered axles in the expansion direction may enable the suspension system 14 to realize the benefits of increased tractive effort in both the first direction of travel 48 and second, opposite direction of travel 50 described above.

FIGS. 5-11 are graphs illustrating various characteristics of the suspension system 14 and corresponding trucks and axle spring systems as installed on an example locomotive according to an embodiment of the present disclosure. In each of FIGS. 5-11, the following specifications are utilized:

| | |
|---|---|
| Locomotive weight | 190,563 kg (420,000 lbs) |
| Static axle weight | 3175 kg (7,000 lbs) |
| Powered primary spring and unpowered primary spring constant | 714 kg/cm (4,000 lbs/in) |
| Static axle separation from frame | 6.4 cm (2.5 in) |
| Powered axle secondary spring constant | 1,786 kg/cm (10,000 lbs/in) |
| Powered axle secondary spring engagement axle to frame separation | 5.1 cm (2 in) |
| Unpowered axle secondary spring constant | 1,786 kg/cm (10,000 lbs/in) |
| Unpowered axle secondary spring engagement axle to frame separation | 7.6 cm (3 in) |

Figure 5:
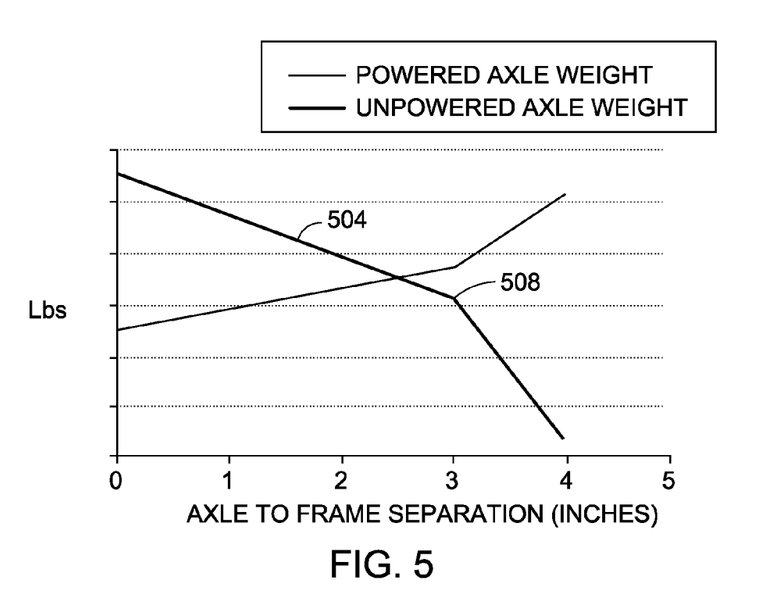
FIG. 5 is a graph illustrating the change in powered and unpowered axle weights as an axle to frame separation distance increases, according to an embodiment of the present disclosure.

FIG. 5 is a graph illustrating the change in powered and unpowered axle weights as an axle to frame separation distance increases. As FIG. 5 illustrates, and with reference also to FIG. 3, the rate of decrease of the unpowered axle weight 504 increases at point 508. Point 508 corresponds to the engagement of the secondary spring 314 that occurs as the separation distance between the truck frame and the unpowered axle carrier passes the transition separation distance 356. Thus, and as depicted in FIG. 5, the overall unpowered axle separation force generated by the unpowered axle spring system has a rate of decrease that increases past point 508 that corresponds to the transition separation distance 356.

Figure 6:
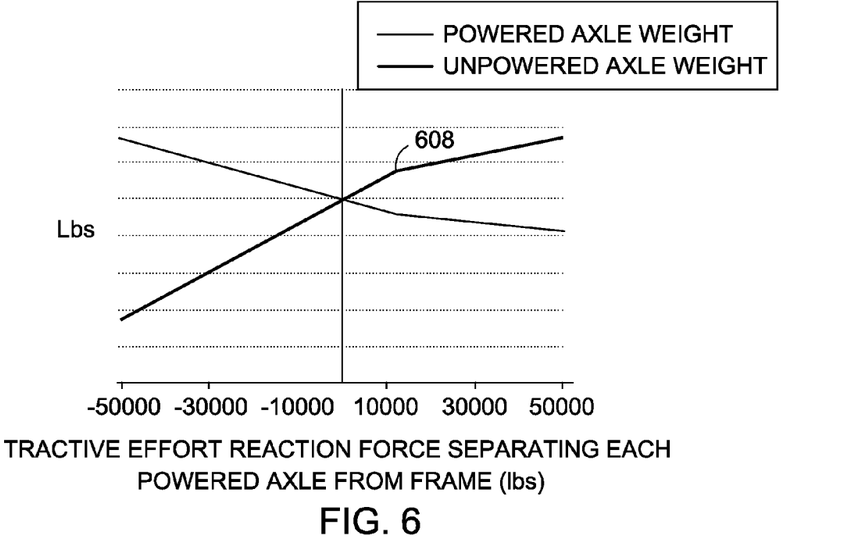
FIG. 6 is a graph illustrating the change in powered and unpowered axle weights as a tractive effort reaction force tending to separate each powered axle from the associated truck frame increases, according to an embodiment of the present disclosure.

FIG. 6 is a graph illustrating the change in powered and unpowered axle weights as a tractive effort reaction force tending to separate each powered axle from the associated truck frame increases. In FIG. 6, point 608 corresponds to point 508 in FIG. 5.

Figure 7:
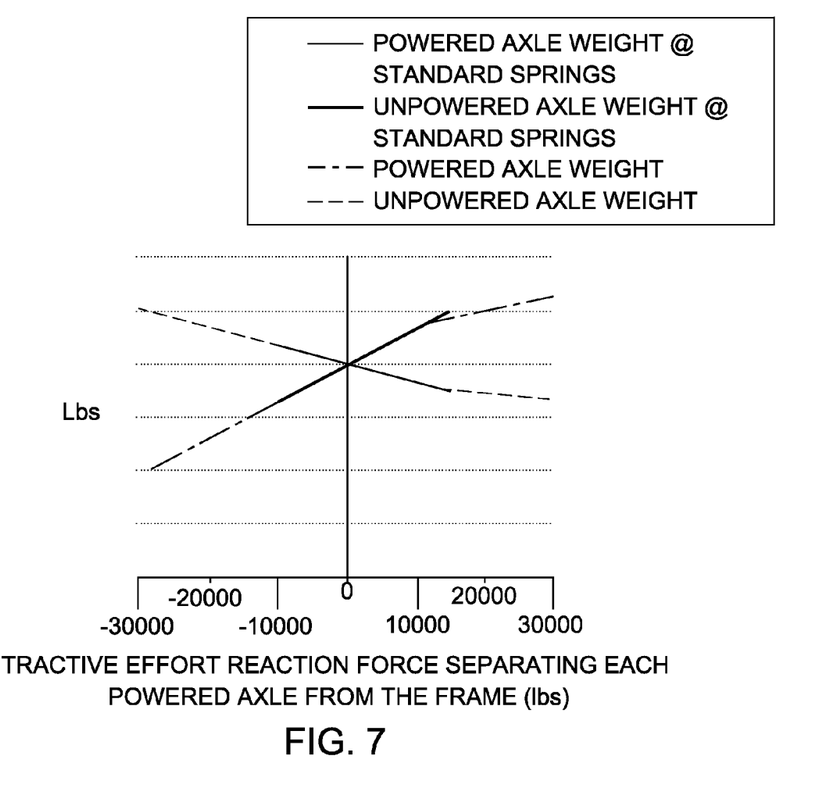
FIG. 7 is a more detailed view of the graph of FIG. 6 illustrating points at which the secondary springs of the powered and unpowered axle spring systems engage and disengage as the tractive effort reaction force increases.

FIG. 7 is a more detailed view of the graph of FIG. 6 illustrating points at which the secondary springs of the powered and unpowered axle spring systems engage and disengage as the tractive effort reaction force increases.

Figure 8:
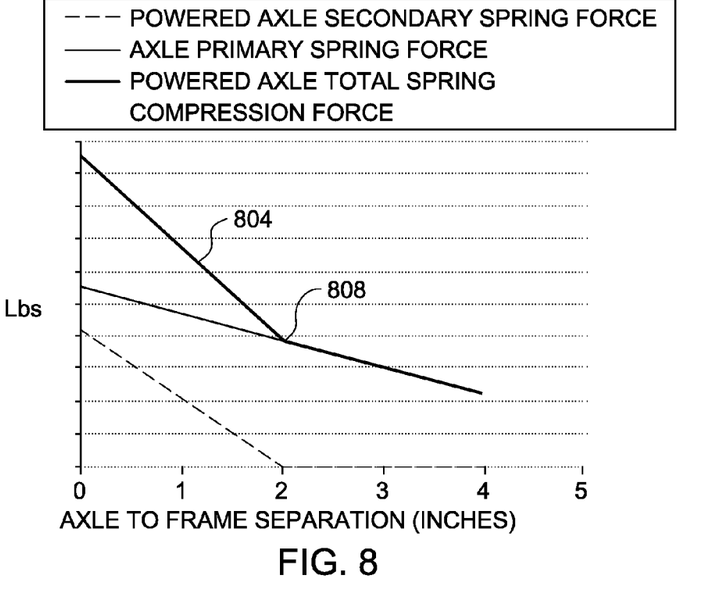
FIG. 8 is a graph illustrating the change in a powered axle primary spring force, secondary spring force and total spring force as an axle to frame separation distance increases, according to an embodiment of the present disclosure.

FIG. 8 is a graph illustrating the change in a powered axle primary spring force, secondary spring force and total spring force as an axle to frame separation distance increases. As FIG. 8 illustrates, and with reference also to FIG. 2, the rate of decrease of the total powered axle spring compression force 804 decreases at point 808. Point 808 corresponds to the engagement of the interior spring 224 that occurs as the separation distance between the truck frame and the powered axle carrier passes the transition separation distance 256. Thus, and as depicted in FIG. 8, the powered axle separation force generated by the powered axle spring system has a rate of decrease that decreases past point 808 that corresponds to the transition separation distance 256.

Figure 9:
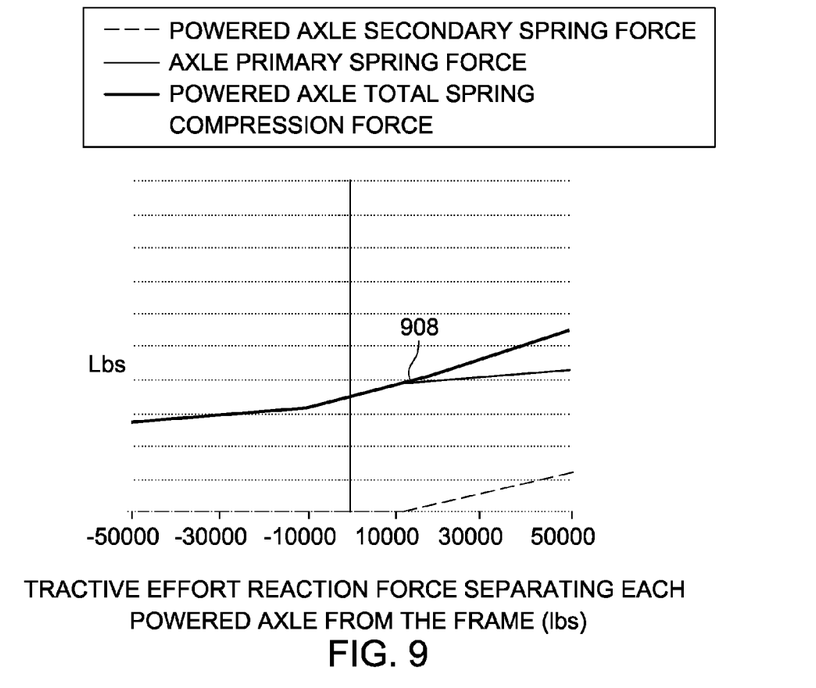
FIG. 9 is a graph illustrating the change in the powered axle primary spring force, secondary spring force and total spring force as a tractive effort reaction force tending to separate each powered axle from the associated truck frame increases, according to an embodiment of the present disclosure.

FIG. 9 is a graph illustrating the change in the powered axle primary spring force, secondary spring force and total spring force as a tractive effort reaction force tending to separate each powered axle from the associated truck frame increases. In FIG. 9, point 908 corresponds to point 808 in FIG. 8.

Figure 10:
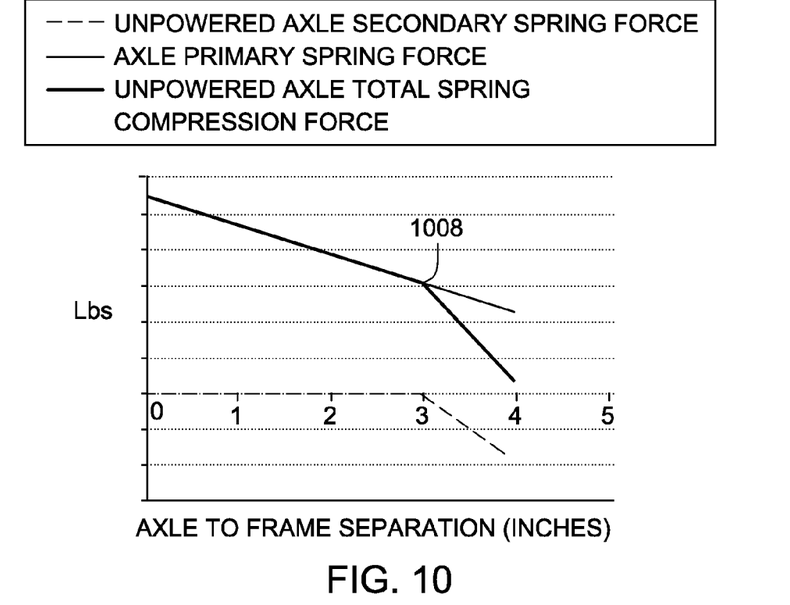
FIG. 10 is a graph illustrating the change in an unpowered axle primary spring force, secondary spring force and total spring force as an axle to frame separation distance increases, according to an embodiment of the present disclosure.

FIG. 10 is a graph illustrating the change in an unpowered axle primary spring force, secondary spring force and total spring force as an axle to frame separation distance increases according to an embodiment of the present disclosure. In FIG. 10, point 1008 corresponds to point 508 in FIG. 5, which corresponds to the engagement of the secondary spring 314 that occurs as the separation distance between the truck frame and the unpowered axle carrier passes the transition separation distance 356.

Figure 11:
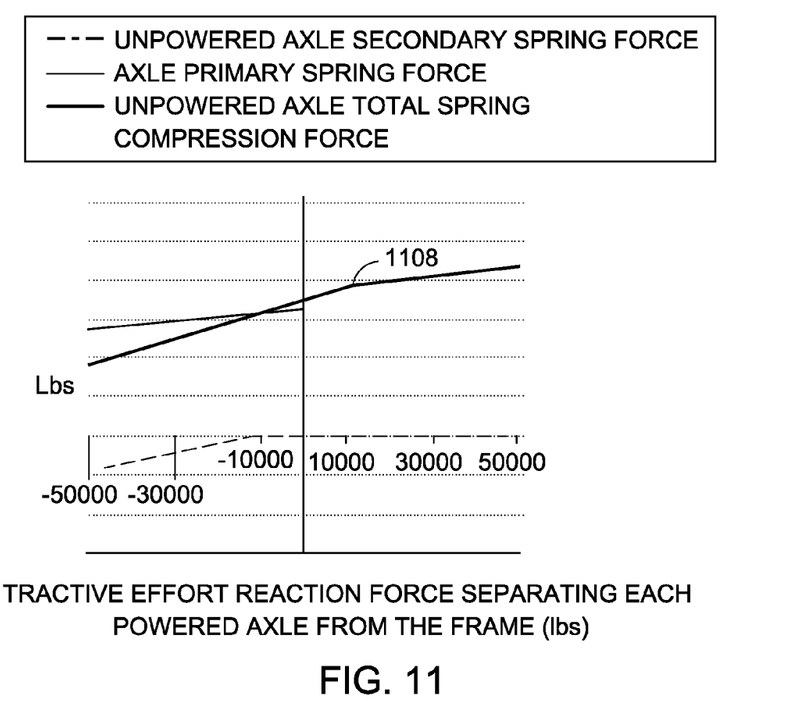
FIG. 11 is a graph illustrating the change in unpowered axle primary spring force, secondary spring force and total spring force as a tractive effort reaction force tending to separate each powered axle from the associated truck frame increases, according to an embodiment of the present disclosure.

FIG. 11 is a graph illustrating the change in unpowered axle primary spring force, secondary spring force and total spring force as a tractive effort reaction force tending to separate each powered axle from the associated truck frame increases. In FIG. 11, point 1108 corresponds to point 1008 in FIG. 10.

As used in the description above, an effective spring rate of a spring system is defined as the ratio between the normal force applied to an axle via the axle carrier and a displacement of the axle/axle carrier with respect to the truck frame 52. Additionally, an element or step recited in the singular and proceeded with the word "a" or "an" should be understood as not excluding plural of said elements or steps, unless such exclusion is explicitly stated. References to "one embodiment" or "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein."

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A truck for a vehicle, comprising:
   an unpowered axle spring system that couples an unpowered axle carrier to a truck frame, the unpowered axle spring system configured to generate an overall unpowered axle separation force between the truck frame and the unpowered axle carrier, wherein a rate of decrease of the overall unpowered axle separation force increases past a first separation distance between the truck frame and the unpowered axle carrier; and
   a powered axle spring system that couples a powered axle carrier to the truck frame, the powered axle spring system configured to generate a powered axle separation force between the truck frame and the powered axle carrier, wherein a rate of decrease of the powered axle separation force decreases past a second separation distance between the truck frame and the powered axle carrier.

2. The truck of claim 1, wherein the second separation distance is less than the first separation distance.

3. The truck of claim 1, wherein the truck is a front truck of a locomotive.

4. The truck of claim 3, wherein the truck may be rotated 180 degrees and installed as a rear truck of the locomotive, and wherein the rate of decrease of the overall unpowered axle separation force still increases past a first separation distance between the truck frame and the unpowered axle carrier, and the rate of decrease of the powered axle separation force still decreases past a second separation distance between the truck frame and the powered axle carrier.

5. The truck of claim 1, wherein the unpowered axle spring system comprises:
   a primary spring that generates at least a portion of the overall unpowered axle separation force; and
   a secondary spring configured to engage the truck frame only when the truck frame expands past the first separation distance between the truck frame and the unpowered axle carrier.

6. The truck of claim 5, wherein the secondary spring includes an engagement member that engages a supporting member of the truck frame only when the truck frame reaches the first separation distance as the truck frame moves in an expansion direction.

7. The truck of claim 6, wherein the engagement member is configured to disengage from contact with the supporting member only when the truck frame passes the first separation distance as the truck frame moves in a contraction direction opposite to the expansion direction.

8. The truck of claim 1, wherein the powered axle spring system is a first powered axle spring system, the powered axle carrier is a first powered axle carrier, and further comprising:
   a second powered axle spring system that couples a second powered axle carrier to the truck frame, the second powered axle spring system also configured to generate the powered axle separation force between the truck frame and the powered axle carrier.

9. The truck of claim 8, wherein the unpowered axle spring system is closer to a center of gravity of the vehicle than the first powered axle spring system and the second powered axle spring system.

10. A spring system for an axle, comprising:
    a forward primary spring having a first effective spring rate and configured to engage a truck frame at all times;
    a forward secondary spring having a second effective spring rate and configured to engage the truck frame only after the truck frame expands past a threshold, to thereby resist further expansion, wherein the forward primary spring and the forward secondary spring are located on a forward side of the axle;

a rearward secondary spring having the second effective spring rate and configured to engage the truck frame only after the truck frame expands past the threshold, to thereby resist further expansion; and a rearward primary spring having the first effective spring rate and configured to engage the truck frame at all times, wherein the rearward secondary spring and the rearward primary spring are located on a rearward side of the axle that is opposite to the forward side.

11. A suspension system for a vehicle, comprising:
a front truck comprising:
    a front powered axle carrier coupled to a front powered axle;
    a front powered axle spring system coupling the front powered axle carrier to a front truck frame;
    a front unpowered axle carrier coupled to a front unpowered axle;
    a front unpowered axle spring system coupling the front unpowered axle carrier to the front truck frame, the front unpowered axle spring system configured to generate a front unpowered axle separation force that is substantially linear as a front separation distance between the front truck frame and the front unpowered axle carrier decreases upon application of a tractive effort; and a rear truck comprising:
    a rear powered axle carrier coupled to a rear powered axle;
    a rear powered axle spring system coupling the rear powered axle carrier to a rear truck frame;
    a rear unpowered axle carrier coupled to a rear unpowered axle; and
    a rear unpowered axle spring system coupling the rear unpowered axle carrier to the rear truck frame, the rear unpowered axle spring system configured to generate a rear unpowered axle separation force, wherein a rate of decrease of the rear unpowered axle separation force decreases past a rear separation distance between the rear truck frame and the rear unpowered axle carrier upon application of the tractive effort.

12. The suspension system of claim 11, wherein the front truck may be rotated 180 degrees and installed as the rear truck.

\* \* \* \* \*

UNITED STATES PATENT AND TRADEMARK OFFICE
CERTIFICATE OF CORRECTION

PATENT NO.        : 8,584,596 B1                                    Page 1 of 1
APPLICATION NO.   : 13/653553
DATED             : November 19, 2013
INVENTOR(S)       : Worden et al.

It is certified that error appears in the above-identified patent and that said Letters Patent is hereby corrected as shown below:

In the Specification

In Column 5, Line 31, delete "fraction" and insert -- traction --, therefor.

In Column 5, Line 41, delete "fraction" and insert -- traction --, therefor.

Signed and Sealed this
Third Day of June, 2014

Michelle K. Lee
*Deputy Director of the United States Patent and Trademark Office*